United States Patent [19]

Comeaux et al.

[11] Patent Number: 4,775,321
[45] Date of Patent: Oct. 4, 1988

[54] SYSTEM FOR TEACHING MONEY VALUES

[76] Inventors: Charlotte Comeaux, 2926 Broussard Rd.; Ann Ritchie, 1124 Melanie, both of Sulphur, La. 70063

[21] Appl. No.: 17,997

[22] Filed: Feb. 24, 1987

[51] Int. Cl.[4] ............................................. G09B 19/18
[52] U.S. Cl. ..................................... 434/110; 273/256
[58] Field of Search .................... 434/110, 109, 191; 273/243, 248, 249, 256, 254, 274, 278

[56] References Cited

U.S. PATENT DOCUMENTS

| | | | |
|---|---|---|---|
| 2,026,082 | 12/1935 | Darrow | 273/256 |
| 2,904,899 | 9/1959 | Lloyd | 434/109 |
| 3,488,864 | 1/1970 | McManus | 434/110 |
| 3,679,210 | 7/1972 | Breslow | 273/256 |
| 3,690,017 | 9/1972 | Holmquist | 434/110 |
| 3,768,177 | 10/1973 | Thomas | 434/110 X |
| 3,889,954 | 6/1975 | Malisow | 273/256 |
| 4,109,918 | 8/1978 | Mele et al. | 273/243 X |
| 4,195,423 | 4/1980 | Iwao | 434/110 X |
| 4,214,755 | 7/1980 | Wysocki | 273/243 |
| 4,273,337 | 6/1981 | Carrera et al. | 273/243 |
| 4,279,422 | 7/1981 | Shaw | 273/243 X |
| 4,363,628 | 12/1982 | Kirkpatrick et al. | 273/286 X |
| 4,426,084 | 1/1984 | Michel | 273/254 |
| 4,484,748 | 11/1984 | Becze | 273/256 |
| 4,501,425 | 2/1985 | Alvarado | 273/249 X |
| 4,521,197 | 6/1985 | Lumpkins | 434/110 |
| 4,571,189 | 2/1986 | Shank | 434/110 |
| 4,629,195 | 12/1986 | Charney | 273/256 X |

Primary Examiner—Richard J. Apley
Assistant Examiner—Robert W. Bahr
Attorney, Agent, or Firm—Pravel, Gambrell, Hewitt, Kimball & Krieger

[57] ABSTRACT

A system for arranging money values into a three-tiered arrangement, including a "Basic Money Lab", "Intermediate Money Lab", and "Advanced Money Lab"; each of the tiers including a plurality of envelopes arranged in ascending order of money values, each envelope in the Basic Money Lab providing coin indicia on the external surface of the envelope, wherein a student is to recognize the coin value and to place that amount of coins within the envelope. The system requires that the student work progressively through the system of envelopes, and recording his progress on a progress chart for that particular lab. Upon completing the Basic Money Lab, the student then moves to the Intermediate Money Lab which includes greater dollar amounts on the series of envelopes; than, and to the Advanced Money Lab which includes various consumer items pictorially depicted on the front portion of the envelope and the money value which would be required to purchase that particular item.

12 Claims, 3 Drawing Sheets

SYSTEM FOR TEACHING MONEY VALUES

BACKGROUND OF THE INVENTION

1. Field of the Invention

The system of the present invention relates to money values. More particularly, the system of the present invention relates to a process for instructing students concerning money and its value, and a multi-tiered approach to instructing students on the value of various increasing denominations of money and its relationship to products or services.

2. General Background

One of the most vital concerns of teaching students is development of a student's appreciation of the value of money. It is often a difficult task to instruct a person regarding the various money denominations, including money in the form of coins or paper money, and to properly instruct the student on the ever-increasing amounts of money required for the purchase of certain goods or services. In today's society, it is imperative that students be fully cognizant of the value of money, and the manner in which the various denominations of money are combined to pay for those certain goods or services.

It is standard in the schools that the manner for teaching the value of money is done on a very traditional basis, in that the basic coin or paper denominations are introduced to the student, and the student is expected to combine these denominations utilizing the present mathematical system of addition, to obtain a sum necessary for the purchase sum. However, this system has been found to have shortcomings in that the student, for the most part, under that system, cannot adequately determine for himself, the proper combination of coins or paper money required to obtain various amounts and, therefore, never truly understands the basic principles of the American money system, which, of course, would plague him the rest of his adult life.

There have been several patents awarded in the area of money recognition, the most pertinent being as follows.

U.S. Pat. No. 3,768,177, entitled "Educational Device", addresses a composite education and amusement kit to provide amusement in training a child to produce finished pictorial representations or to learn numerical and letter sequences. One of the objects of the system is to teach, in a crude form, the counting of money.

U.S. Pat. No. 4,195,423, entitled "Pop-Up Cash Register", relates to a system which is similar to a cash register and depicts pictures or replicas of merchandise coordinated with the dollar and cent values together with the total sum and their money values including program channels associated for controlling operation of the toy register.

U.S. Pat. No. 2,904,899, entitled "Educational Banking Game for Teaching Children Good Thrift Habits", relates to an educational banking game for children that attempts to teach good thrift habits as well as an appreciation of the way in which a bank checking system operates. The system includes a bank kit having a check book, play checks and stubs for counting, envelopes, savings account passbook, coin bank and pen. The invention relates to the system in which the kit is utilized.

U.S. Pat. No. 4,571,189, entitled "System for Teaching Coin Relationships", relates to providing a system for teaching skills in handling coins and bills to students with limited learning capability including coin identification and comparative coin values, coin equivalences, and making change of certain coin amounts.

U.S. Pat. No. 3,488,864, entitled "Device for Teaching Monetary Skills", provides an elongated channel for receiving one cent pieces from a communicated storage compartment. The bottom of the channel is provided with numerals which are so spaced that they are concluded as the one cent pieces are moved from the storage area to the channel and can receive ten (10) one cent pieces.

U.S. Pat. No. 3,690,017, entitled "Coin Value Teaching Device", relates to providing a coin value teaching apparatus which is effective in teaching children not only how to count coins but how to make change with respect to such coins. There is included a rectangular number board having an upper surface arranged in squares each having a number therein, with the squares numbered from one to one hundred for representing coins that would be placed upon the board to determine the ultimate value.

SUMMARY OF THE PRESENT INVENTION

The system of the present invention provides a system of money value recognition in a simple and straightforward manner. What is provided is a system for arranging money values into a three-tiered arrangement, including a "Basic Money Lab", "Intermediate Money Lab", and "Advanced Money Lab"; each of the tiers including a plurality of envelopes arranged in ascending order of money values, each envelope in the Basic Money Lab providing coin indicia on the external surface of the envelope, wherein a student is to recognize the coin value and to place that amount of coins within the envelope. The system requires that the student work progressively through the system of envelopes, and recording his progress on a progress chart for that particular lab. Upon completing the Basic Money Lab, the student then moves to the Intermediate Money Lab which includes greater dollar amounts on the series of envelopes;, than, and to the Advanced Money Lab which includes various consumer items pictorially depicted on the front portion of the envelope and the money value which would be required to purchase that particular item. There is also provided a source of play money whereby the student can actually count money amounts in coin or paper. Upon completion of the Basic, Intermediate and Advanced labs, the student has a full awareness of the American system of money and the various values attached to the various coin and paper amounts.

Therefore, it is the principal object of the present invention to provide a system whereby a student learns to recognize coin and paper money amounts on their face in a "Basic Money Lab";

It is still a principal object of the present invention to provide a system whereby a student learns to recognize money amounts of greater values including the numerical written value in the "Intermediate Money Lab";

It is still a principal object of the present invention to provide a system whereby a student can determine the money amounts required to purchase certain consumer items in an "Advanced Money Lab";

It is still a further object of the present invention to provide a system whereby a student works through various increasingly more difficult series of envelope in the system so as to recognize various combinations of money while working through the system;

It is still a further object of the present invention to provide a system whereby a student actually counts out money values in the form of coin or paper money and charts his progress in the system on a progress sheet; and It is still a further object of the present invention is to provide a system whereby students learn the value of money in the context of the items that money can purchase and to recognize various denominations of money in the American system of money.

PREFERRED EMBODIMENT OF THE PRESENT INVENTION

FIGS. 1-5 illustrate the preferred embodiment of the system of the present invention. The system of the present invention relates to a system for educating a student on the value of money and the purchase of certain items. The system is divided into three tiers, which shall be delineated as "Basic Money Lab", "Intermediate Money Lab", and "Advanced Money Lab". The arrangement of the system into a three-tiered system provides for an increasingly sophisticated system whereby the student begins at the basic level and works through the process of recognizing the value of money, as compared to appropriate consumer items that can be purchased for that amount.

Figure 1:
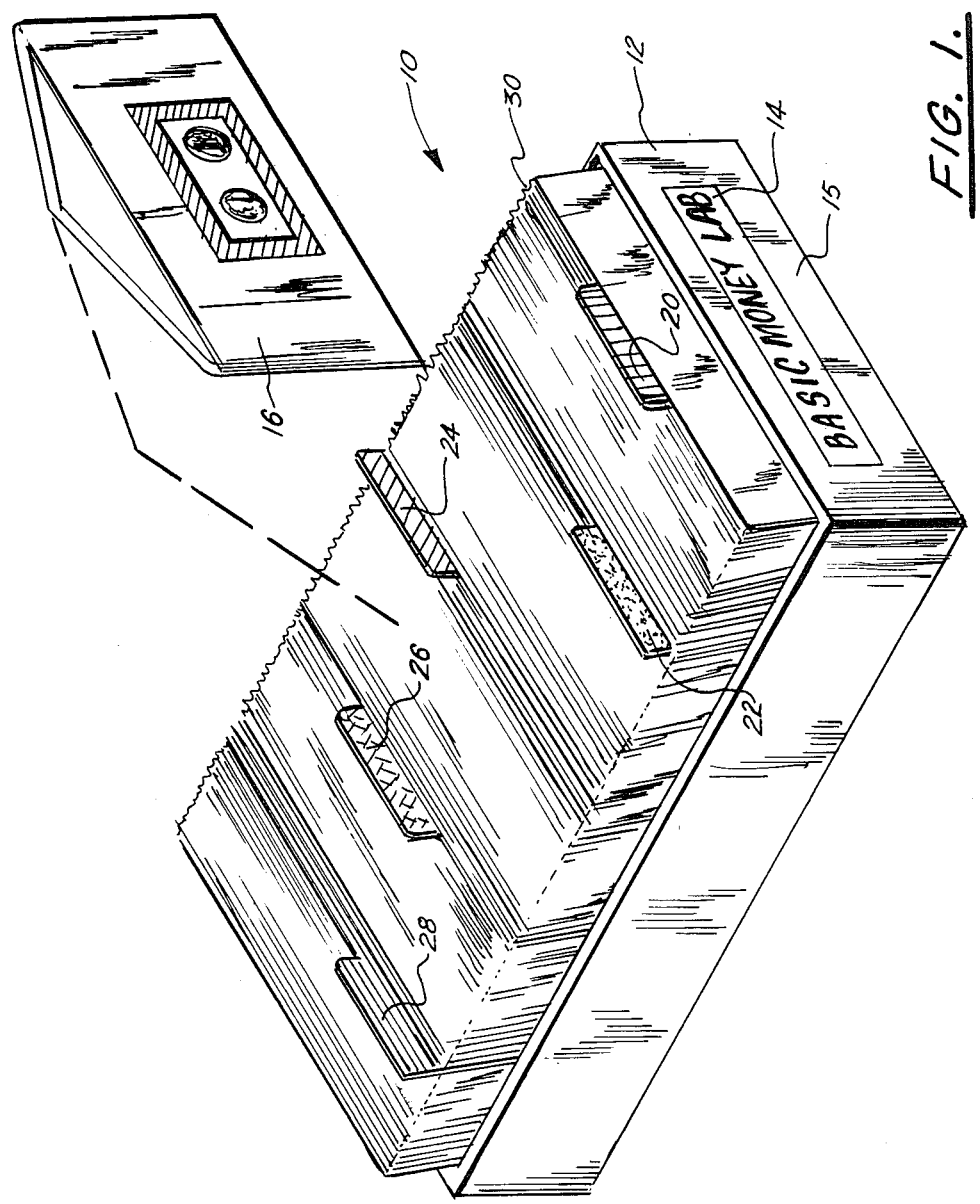
FIG. 1 represents a partial view of the Basic Money Lab and a preferred embodiment of the present invention.

Turning now to FIG. 1, FIG. 1 is a representational view of the Basic Money Lab system as indicated by the numeral 10. As seen in FIG. 1, in the preferred embodiment of the system, there would be provided a box or container portion 12 wherein the Basic Money Lab is indicated at 14 on the front side 15 of the container, the container housing a plurality of envelopes 16, the purpose of which will be explained further. The purpose of the Basic Money Lab is to introduce the student to the concept of money. In the utilization of the Basic Money Lab, the envelopes 16 are divided into a plurality or preferably 9 categories, each of the 9 categories designated by a different color. As seen in FIG. 1, the first category 20 is illustrated by a divider showing the color red, with each of the different categories having a divider by the appropriate color. In the Basic Money Lab system, the color system is as follows: (1) red—recognizing penny, nickel, and dime; (2) blue—recognizing penny, nickel, and dime,; (3) green—recognizing penny, nickel, dime, and quarter; (4) orange—recognizing penny, nickel, dime, quarter, and fifty cents; (5) brown—recognizing penny, nickel, dime, quarter, and fifty cents; (6) yellow—counting money for items that cost less than one dime; (7) purple—counting money for items that are divisible by 5; (8) pink—counting money for items that cost less than two dollars; (9) black—review of miscellaneous values less than fifty cents. Therefore, as seen in FIG. 1 in each of the sections that are color-coded, there is contained twelve envelopes. The first five sections of the lab deal primarily with matching and recognizing various coins; i.e., section red is indicated by the numeral 20, blue is indicated by the numeral 22, green is indicated by the numeral 24, orange is indicated by the numeral 26, and brown is indicated by the numeral 28. The last four sections, i. e., yellow, purple, pink, and black, introduce the student to actually counting small change up to two dollars. Therefore, there would be a second container 12, which would have the last four sections contained with twelve envelopes, sixteen within each section.

Figure 2:
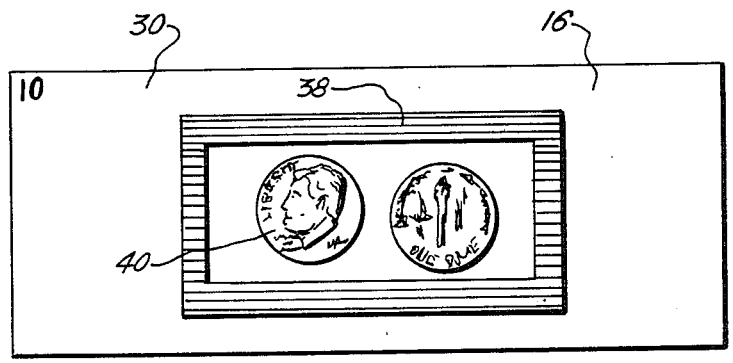
FIG. 2 represents an envelope of the type utilized in a Basic Money Lab.

Therefore, in the use of the system, the student will go through the first red envelope 30, remove the envelope 30, that envelope 30 may be as is illustrated in FIG. 2. FIG. 2 there is illustrated with envelope 30 having an front facing 38 which is likewise colored red, facing 38 having on its face an illustration of coins 40, in this case the front and back face of a silver dime. The student would in the use of the system, remove the envelope, recognize the coin value 40 as illustrated on the face of the envelope 30, and, going to a source of play coins, would place two silver dimes in the envelope, and return the envelope to the lab. The student would work through each envelope in section 20 red, and after he has completed the task of putting the necessary amount of coins in the envelope, as indicated on the face 38 of the envelope, the teacher would then check to see if the correct amount of money is in each envelope.

Figure 5:
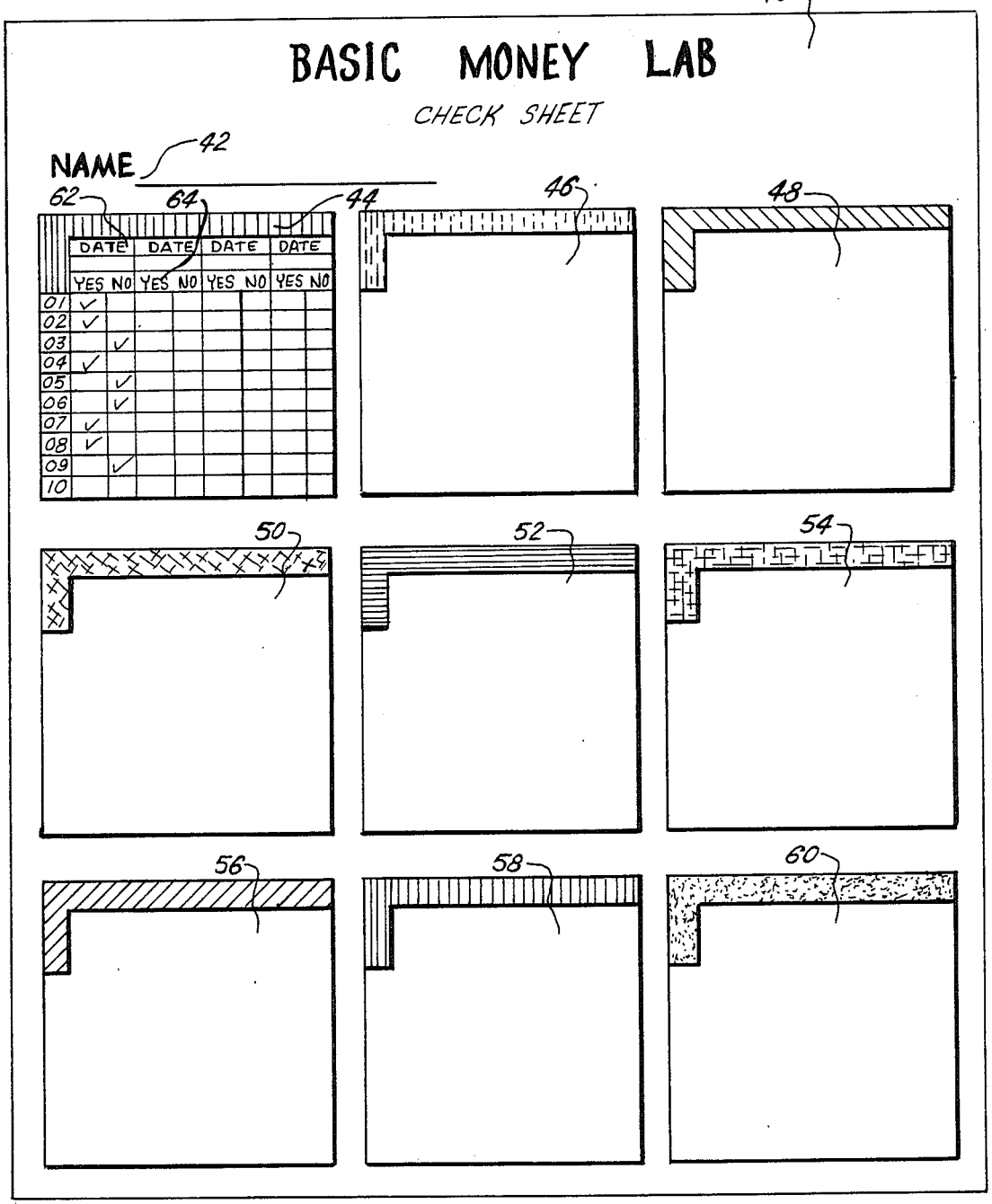
FIG. 5 represents a view of a sample money lab check sheet which is utilized in charting the student's progress as the student works through each lab.

Following that, reference is made to FIG. 5, wherein there is illustrated a basic check sheet 40, which would contain the student's name 42, and would likewise contain a check sheet indicator 44 for each of the colored sections within the basic money lab. For purposes of illustration, the first red section 44 is illustrated in full for the other sections 46-60, for the other sections would likewise have that same indicia on their face, the indicia indicating the date 62 and the response of "yes", "no", as to whether or not the student was correct in his responses, and the necessary blocks for each of the nine sections of the Basic Money Lab. Since each indicator is color-coded, it is quite easy to recognize the necessary check sheet, which must be filled out according to the section that the student had completed. If the proper amount of money was placed in envelope 1, then "yes" would be checked as seen in check sheet 44. Likewise, would follow for the other sections. Those sections labeled "no" would indicate that the student had placed the incorrect amount of money in that particular envelope and, therefore, in all likelihood need more practice in that area.

Figure 3:
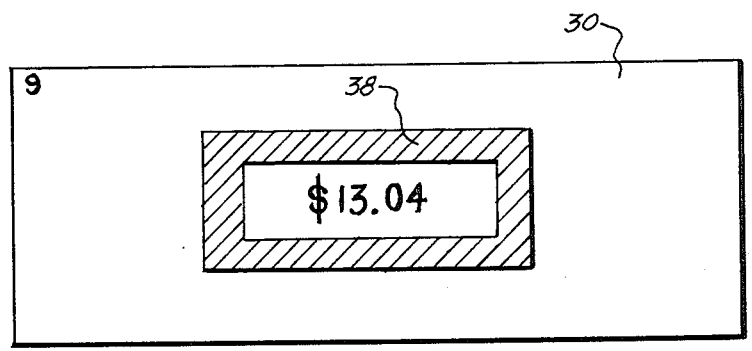
FIG. 3 illustrates an envelope of the type used in the Intermediate Money Lab.
Figure 4:
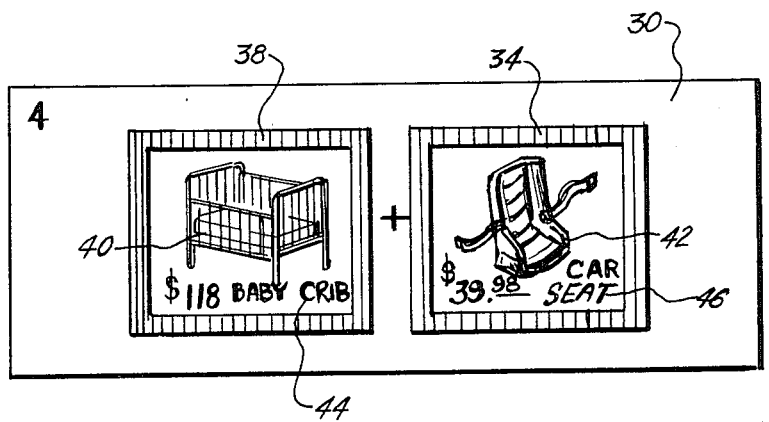
FIG. 4 represents an envelope of the type used in the Advanced Money Lab.

For purposes of illustration, the Intermediate Money Lab and the Advanced Money Lab would work in a similar manner. However, for the various color-coded sections 20-28 as seen in FIG. 1, the color-coded sections for the Intermediate Money Lab would be as follows: (1) red values up to one dollar; (2) blue—one dollar to ten dollars; (3) green—ten dollars to twenty dollars; (4) orange—twenty dollars to fifty dollars; (5) brown—fifty dollars to one hundred dollars; (6) yellow—one hundred to two hundred dollars; (7) purple—one hundred to one thousand dollars; (8) pink—computing numeral words into dollars and cents; (9) black—miscellaneous values. Reference is made to FIG. 3 which represents an envelope in the Intermediate Money Lab. In that figure, there is again seen an envelope 30, which would be designated, for example, as the first envelope 30 in the red section 20 as seen in FIG. 1. That envelope would be removed, likewise having an indicia face 38 with a number value of "$13.04," on its face. The student would recognize that value and again go to the play money and count out $13.04, place it in the envelope, and follow through the remaining envelopes in the red section. Again, upon completion of that section, the teacher would then go through the section, check each envelope, and mark down on the appropriate colored check sheet whether or not the student was correct or not, as was done in the Basic Money Lab. Again, any amounts incorrectly noted would be reviewed and practiced.

Likewise, turning to the Advanced Money Lab, again the Advanced Money Lab would introduce the students to the calculator in such a way that it would improve their concept of money spending. The Advanced Money Lab would focus on practical home living expenditures that occur in daily living. It would introduce the student to the world of comparison shopping and prepare them for the future, important to family budgeting. The Advanced Money Lab is designed to assist the student in reading by correlation between picture and word. Again, like the Basic and Intermediate Money Labs, the Advanced Money Lab is also broken down into nine color-coded sections, these sections outlined as follows: (1) red—grocery items; (2) blue—fast food and snacks; (3) green—jewelry and clothing; (4) orange—health and beauty aids; (5) brown—furniture; (6) yellow—housewares and appliances; (7) purple—sporting goods; (8) pink—automotive, hardware, and garden tools; (9) black—toys. A hand calculator is provided with this lab, along with an answer key for each section.

Again, turning now to FIGS. 1 and 4, in this case FIG. 1 in the Advanced Money Lab would again have the nine color-coded sections, with each section having a series of twelve envelopes therein. Reference is made to FIG. 4 where again there is an envelope 30 having a pair of indicia labeled 38 and 39 thereupon, with each label containing a consumer item in the case of a baby bed 40 and a baby car seat 42. Below each of the items, there would be a word description 44 for "baby crib" and 46 for "car seat", and a price of "$118.00" for the baby crib and "$39.98" for the car seat. Therefore, again the student would visualize the item, the word which describes that item, and would count out with the help of the calculator the total cost of the baby crib and car seat and place that amount in play money into the envelope. Again, after working through each envelope in a section, the envelopes would be checked by the teacher, and on the proper Advanced Money Lab check sheet, the teacher would indicate which envelopes had the correct amounts and which did not, and likewise practice would be had in that area where the student was incorrect.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of learning money values, comprising the following steps:
    a. providing a plurality of visual indicators each of which pictorially indicates a certain money value arranged in a predetermined order from the smallest to the largest quantity;
    b. providing a source of money in a quantity to at least equal each of the money values indicated on each of the indicators; next,
    c. selecting the visual indicator of the smallest money value provided; next;
    d. counting a quantity of money from the source of money provided which would be equal to at least the money value indicated on the visual indicator selected; and next,
    e. selecting additional visual indicators each of a sequentially increasing value, and counting out a quantity of money equal to at least the money value on each selected indicator.

2. The method in claim 1, wherein the method would comprise a plurality of envelopes wherein a different money value would be indicated on the face of each envelope.

3. The method in claim 2, wherein one would be required to place the quantity of money in the envelope equal to the amount of money indicated on the face of the envelope.

4. The method in claim 2, wherein the plurality of envelopes would be divided into a plurality of color-coded sections, wherein each section would contain at least 12 money valued envelopes.

5. The method in claim 2, further comprising the step of providing chart means for allowing the one to chart one's progress as one would complete each color-coded sections of the envelopes.

6. The method in claim 2, wherein the method would further comprise a basic set of envelopes, an intermediate set of envelopes, and an advanced set of envelopes, so that each set of envelopes would provide an increasingly difficult money value task for one to achieve in the learning process.

7. A method of teaching the value of money to individuals, the method comprising the following steps:
    a. providing a first group of indicators, each of said indicators pictorially indicating a certain quantity of money on the face of the indicator;
    b. separating the plurality of indicators which indicate money values into a plurality of color-coded groups, each color-coded group comprising money value indicators arranged in a sequence of increased value of the quantity indicated on the indicator;
    c. providing a second group of money value indicators, each of the indicators arranged in a sequence from the smallest to the largest value in that group and indicating a money value of an amount greater than the money value indicated in the first group of indicators in subsection (a);
    d. selecting the indicator of the smallest money value from subsection (a) and obtaining a quantity of money to fulfill the money value indicted on the indicator, and progressing through the indicators from the smallest to the largest of the group; next,
    e. selecting the indicator of the smallest money value from subsection (c) and obtaining a quantity of money to fulfill the money value indicted on the indicator, and progressing through the indicators from the smallest to the largest of the group.

8. The method in claim 7, wherein the second group teaches a more advanced system of money value recognition than the first group.

9. The method in claim 7, wherein the money value indicated in a first group would be indicated as a pictorial representation of coin money.

10. The method in claim 7, wherein the money value indicated in a second group would be indicated in the form of numbered dollar amounts.

11. The method in claim 7, including the steps of:
 (a) providing a third group pf indicators, each of said indicators pictorially representing a consumer item with a money value amount; next,
 (b) selecting a consumer item indicator and obtaining a quantity of money to fulfill the money valve indicated on the indicator, and progressing through the indicators fromt he smallest to the largest of the group.

12. A method of learning the value of money, by an individual, comprising of the following steps:
 a. providing a first plurality of envelopes, each of the envelopes indicating on its face a certain money value, the envelopes arranged in an order of increasing money values;
 b. providing a plurality of elements, each of the elements representing a denomination of money; next,
 c. selecting a money value amount as indicated on the face of the first envelope in the arranged order; next,
 d. counting out a quantity of elements representing the money denomination equal to the amount indicated on the selected envelope; next,
 e. repeating the step of selecting an envelope in the next highest quantity in the arranged order of envelopes so that the entire plurality of envelopes are selected through the order; next,
 f. providing additional groups of envelopes, each of the groups of envelopes likewise having a preselected order of indicating quantities of money on the envelopes; next,
 g. repeating steps (c) through (e), so that all envelopes have been selected and the money quantity indicated on the face of each envelope has been collected.

* * * * *